(12) United States Patent
Ooms et al.

(10) Patent No.: US 6,522,630 B1
(45) Date of Patent: Feb. 18, 2003

(54) EXPLICIT ROUTING METHOD

(75) Inventors: Dirk Ooms, Antwerp (BE); Wim Livens, Reet (BE)

(73) Assignee: Alcatel, Paris (FR)

(*) Notice: Subject to any disclaimer, the term of this patent is extended or adjusted under 35 U.S.C. 154(b) by 0 days.

(21) Appl. No.: 09/316,394

(22) Filed: May 21, 1999

(30) Foreign Application Priority Data

May 7, 1999 (EP) ............................................. 99401137

(51) Int. Cl.$^7$ ................................................ G01R 31/08
(52) U.S. Cl. ........................................ 370/238; 370/389
(58) Field of Search ................................. 370/351, 461, 370/256, 254, 238, 237, 235, 386, 389; 395/200; 709/238, 242

(56) References Cited

U.S. PATENT DOCUMENTS

| | | | |
|---|---|---|---|
| 5,796,740 A | * 8/1998 | Perlman et al. | 370/401 |
| 5,881,246 A | * 3/1999 | Crawley et al. | 709/238 |
| 5,943,317 A | * 8/1999 | Brabson et al. | 370/238 |
| 6,374,303 B1 | * 4/2002 | Armitage et al. | 370/390 |

FOREIGN PATENT DOCUMENTS

| | | | |
|---|---|---|---|
| EP | 1056234 | * 9/2000 | H04J/3/14 |

OTHER PUBLICATIONS

"Internet Protocol, Darpa Internet Program Protocol Specification" w/reference RFC791, Sep. 1981, Internet Engineering task Force (IETF).

* cited by examiner

*Primary Examiner*—David Vincent
(74) *Attorney, Agent, or Firm*—Sughrue Mion, PLLC

(57) ABSTRACT

The present invention relates to an Explicit Routing Method used in a packet-based network containing a number of network-nodes, source-nodes and destination-nodes. All before mentioned network elements are interconnected by links. This method is used to route a packet-flow from a source node towards a destination node, along an explicit path through a number of these network-nodes. This method includes the step of determination of the explicit path of the packet-flow between the source-node and the destination-node. A subsequent step is the determination of the relevant intermediate network-nodes situated on the explicit path which are necessary to deviate said packet-flow from a hop-by-hop-path onto said explicit path and further adding only addresses of these relevant intermediate network-nodes to the packets of the packet-flow. A following step is forwarding the packet-flow from the source-node towards the destination-node in direction of the explicit path.

9 Claims, 7 Drawing Sheets

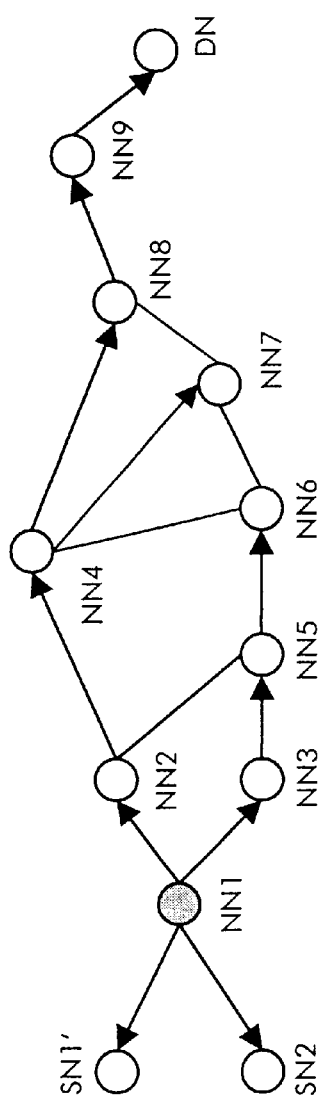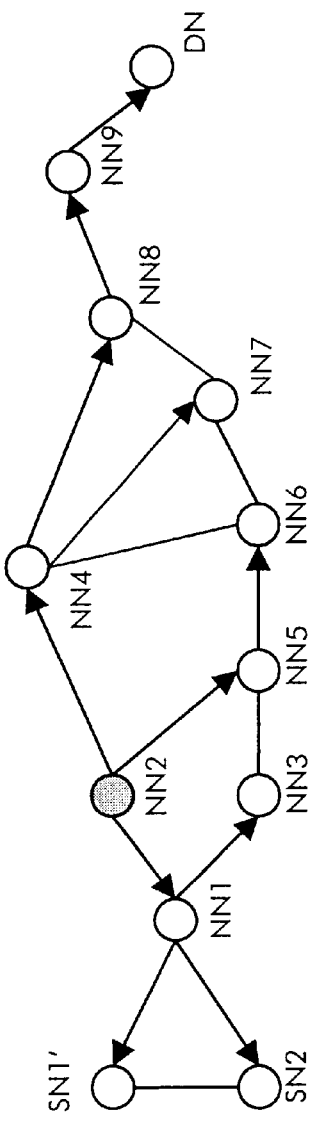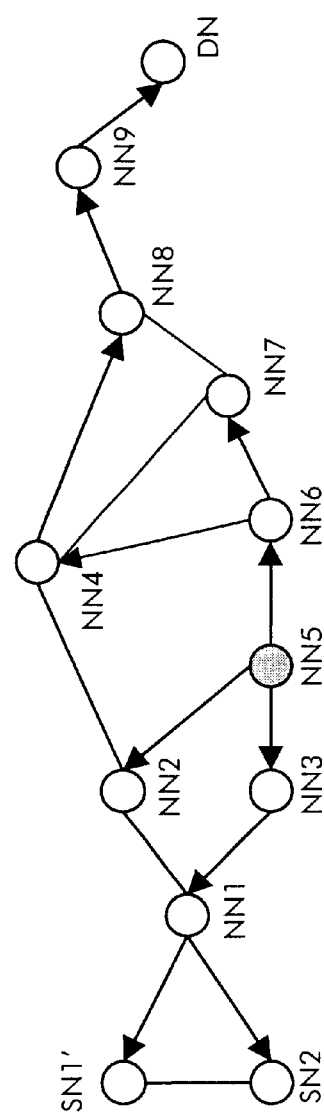
FIG. 5:
FIG. 6:
FIG. 7:

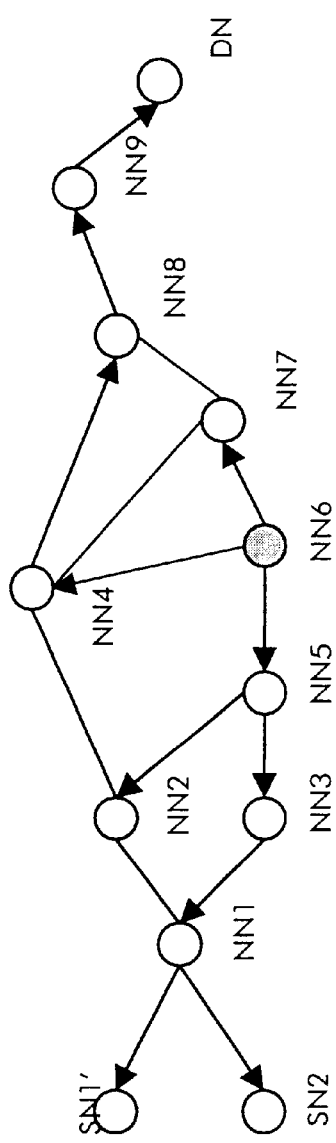
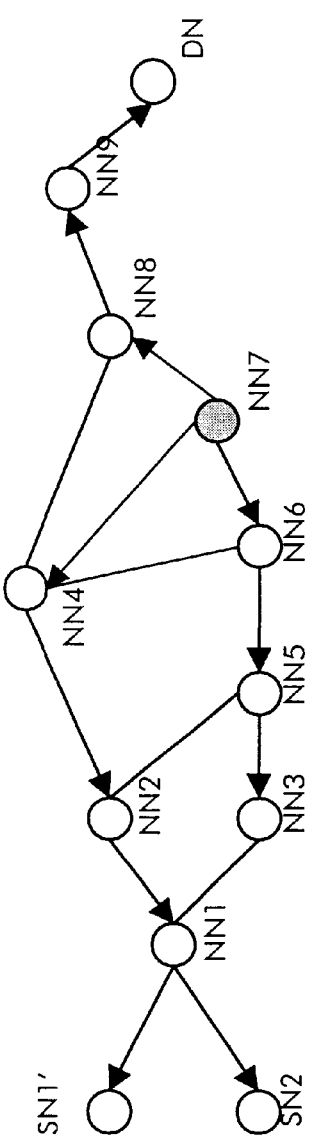
FIG. 8:
FIG. 9:
FIG. 10:

EXPLICIT ROUTING METHOD

BACKGROUND OF THE INVENTION

The present invention relates to an explicit routing method for altering the normal routing of a packet-flow as described in the preamble of claim 1, related arrangements as described in the preambles of claim 4 and a source node as described in the preamble of claim 7.

Such an explicit routing method is already known in the art, e.g. from the internet document "INTERNET PROTOCOL, DARPA INTERNET PROGRAM PROTOCOL SPECIFICATION" with reference RFC791, published in September 1981 by Internet Engineering task Force (IETF).

Therein a method of explicit routing through an internet network, called loose or strict source routing, is described. A packet-flow is forwarded from a source-node towards a destination node along an explicit path. An explicit path is specified by intermediate network-nodes. The addresses of these intermediate network-nodes are put in the header of each packet of the packet-flow. By putting the addresses of these intermediate network-nodes of the explicit path in the header of each packet, the overhead of each packet is substantially large.

SUMMARY OF THE INVENTION

An object of the present invention is to provide an explicit routing method of the above known type but the packet-overhead should be reduced substantially.

According to the present invention, this object is achieved by the method as claimed in claim 1, the arrangements as claimed in claim 4 and the source node as claimed in claim 7.

Indeed, by determination of only those intermediate network-nodes on the explicit path that are necessary to deviate the packet-flow from the hop-by-hop path onto the explicit path the object of the present invention is achieved. As long as a packet-flow is forwarded to a downstream intermediate network-node on the explicit path that also is situated on the hop-by-hop path, the packet-flow will be forwarded without adding the network-node address to each packet, because the common present routing mechanism will handle the forwarding along the hop-by-hop path. Consequently, by adding to the packet address only the explicit specification (of this downstream network-node) necessary to force the packet-flow onto the explicit path, the packet header overhead is reduced substantially compared to the explicit routing method as known in the art.

It is to be noticed that in spite of the fact that the prior art document is situated within the internet area, the invention is not restricted hereto because the present invention can be applied in any packet-based network.

Another characteristic feature of the present invention is described in the appended claims 2 and 5 and is related to the determination of relevant intermediate network nodes.

If the source node has information at its disposal, concerning only the shortest path tree from the source node towards all other network nodes and the destination node, then the shortest path tree is used, by the source node, to determine which network nodes on the explicit path are necessary to deviate the packet-flow from the hop-by-hop path onto the explicit path.

A further characteristic feature of the present invention is described in the appended claims 3 and 6 and are also related to the determination of relevant intermediate network nodes.

If the source node is provided with information concerning the shortest path trees from the source node, from each of the network nodes and the destination node towards all other nodes present within the network, the source node can based hereon determine which network nodes on the explicit path are necessary to deviate the packet-flow from the hop-by-hop path onto the explicit path. The result is optimised compared to the previously described situation, meaning that the number of the to be added network node addresses is reduced or in the worst case the same.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

DETAILED DESCRIPTION OF THE INVENTION

Figure 1:
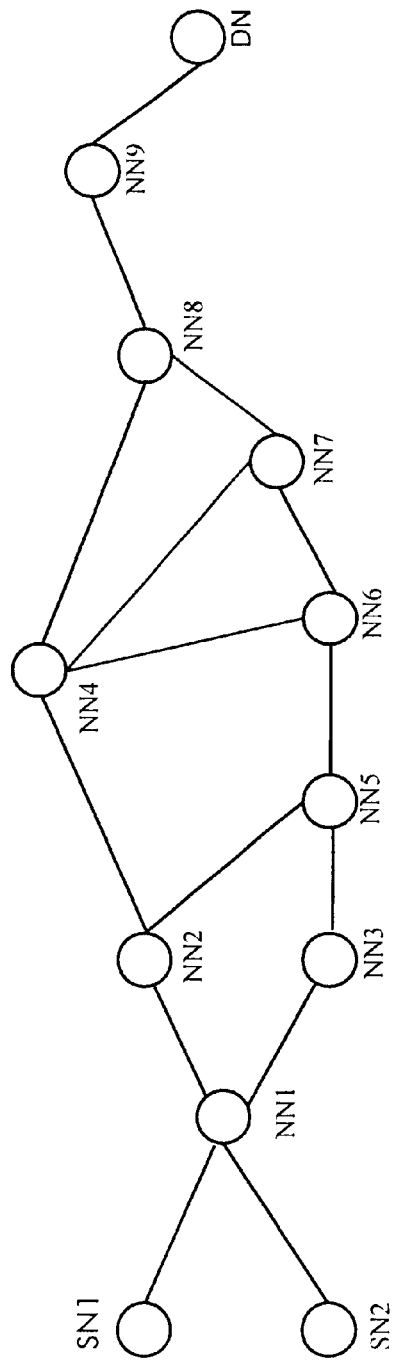
FIG. 1 represents an Internet network wherein the explicit routing method of the present invention is realised.

In the following paragraphs, referring to the drawings, an implementation of the method and related arrangement according to the present invention will be described. In the first paragraph of this description the main elements of this explicit routing arrangement are described. In the second paragraph, all connections between the before mentioned internet network elements and described means are defined. In the succeeding paragraph the actual execution of the explicit routing arrangement is described. Thereafter, in the further description a second embodiment of the present invention is described.

The essential network elements of this embodiment of the present invention are the source nodes SN1 and SN2, the network nodes NN1–NN9 and the destination node DN as shown in FIG. 1. In this embodiment both the source nodes SN1, SN2 and the destination node DN are computer terminals connected to the internet network and the network nodes NN1–NN9 are routing devices.

The source nodes SN1, SN2 both are connected to network node NN1. Network Node NN1 is connected to the network nodes NN2 and NN3 which are, in its turn are connected to network Node NN5. Network Node NN5 is connected to network node NN6. Both network Node NN2 and NN6 are connected to network node NN4. Network node NN6 is also connected to network node NN7, which in its turn is connected to network nodes NN4 and NN8. Network node NN8 is connected to network Node NN4 and NN9 that in its turn is connected to destination node DN. All mentioned connections between the described network elements exist of an IP-link.

Figure 2:
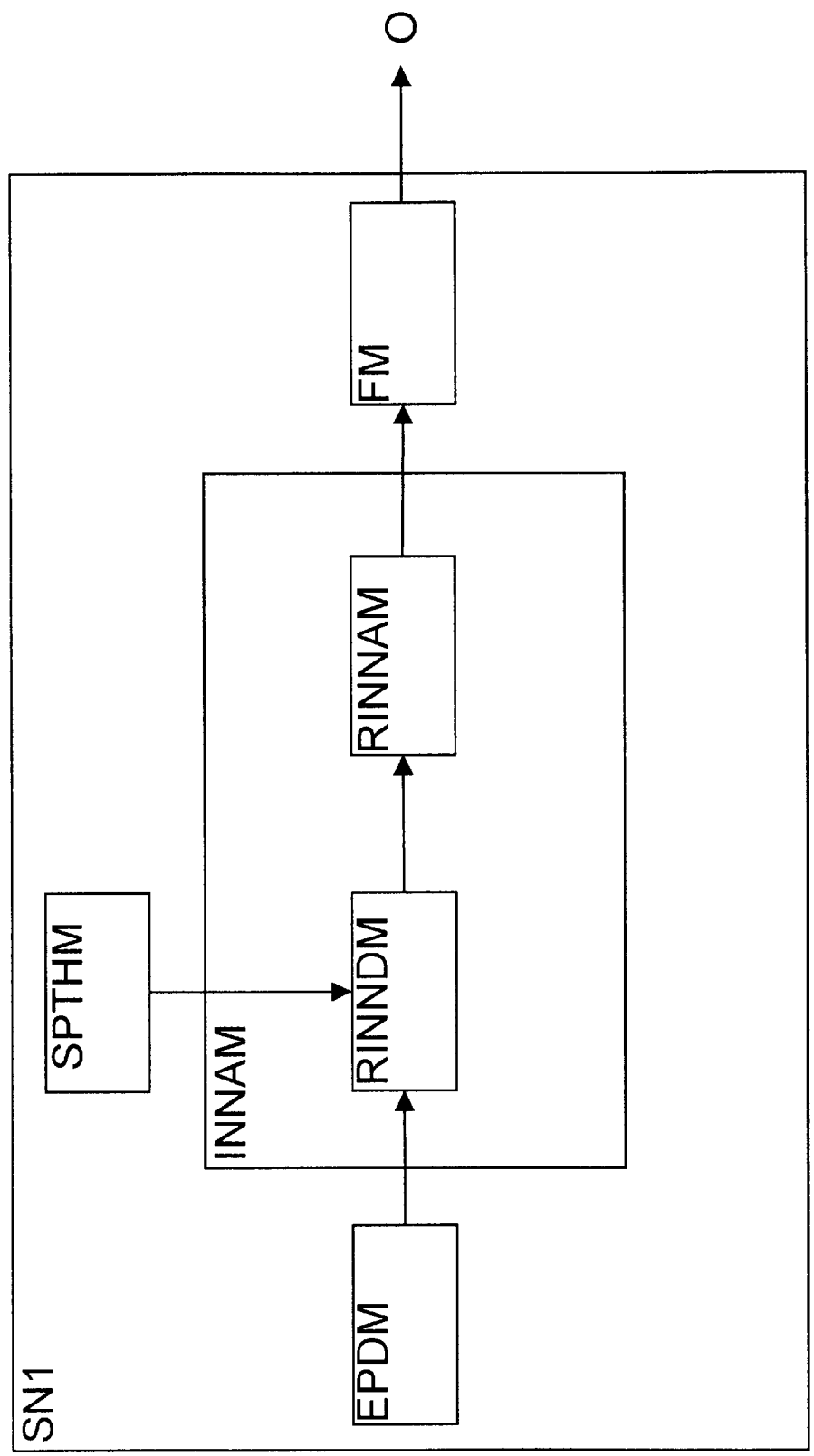
FIG. 2 represents the functional built-up of source node SN1 of FIG. 1.

An important network element is the source node SN1, as presented in FIG. 2, which takes care of the sending of an internet packet flow from source node SN1 towards destination node DN along an explicitly determined route.

The main elements of source node SN1 are the explicit path determination means EPDM which takes care of determining the explicit path between the source-node SN1 and the destination-node DN, the intermediate network-node adding means INNAM which is adapted to add intermediate network-nodes addresses to each packet of the internet packet-flow and a forwarding means FM which takes care of forwarding the internet packet-flow from the source-node SN1 in direction of the destination-node DN along the before determined explicit path.

The intermediate network-node adding means INNAM contains a relevant intermediate network-nodes determination means RINNDM handling the determination of all relevant intermediate network-nodes on the explicit path which are necessary to deviate said packet-flow from a hop-by-hop-path onto said explicit path and a relevant intermediate network-nodes adding means RINNAM which is adapted to add addresses of only the relevant intermediate network-nodes to each packet of the internet packet-flow. Besides these means there is a shortest path tree holding means SPTHM which holds information about the shortest path tree from the source node towards each of the network-nodes and the destination nodes.

The explicit path determination means EPDM is coupled to the relevant intermediate network-nodes determination means RINNDM which in its turn is coupled to a relevant intermediate network-nodes adding means RINNAM. The relevant intermediate network-nodes adding means RINNAM is coupled to the forwarding means FM which has an output terminal that is also an output-terminal O of the source node SN1.

Figure 3:
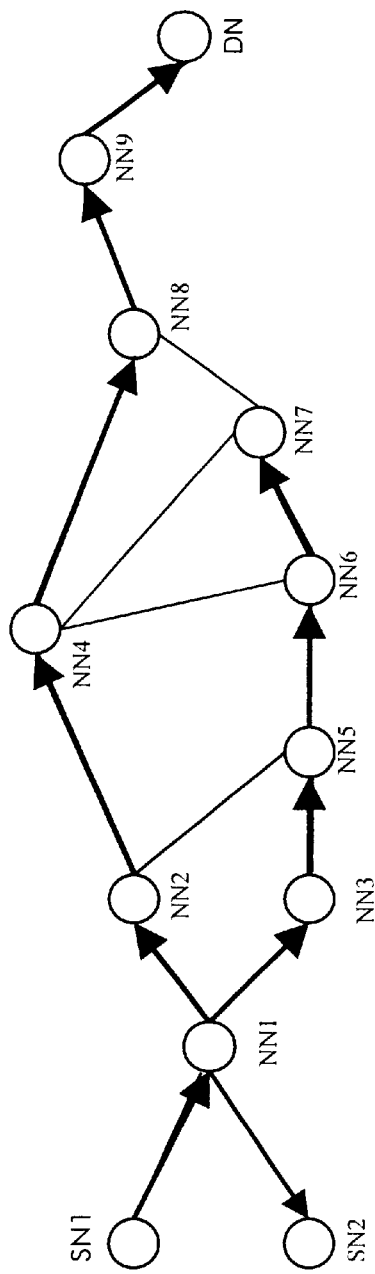
FIG. 3 represents a shortest path tree from source node SN1 towards all network nodes of the internet protocol network as presented in FIG. 1.

In order to explain the operation of the present invention it is assumed that source node SN1 intends to send an internet protocol packet-flow, further referred to as an IP packet-flow, towards destination node DN along an explicit path instead of along the usually followed hop-by-hop path in order to reduce the load over the links between Network node NN2 and network node NN8 of this hop-by-hop path. The explicit path is assumed to lead through the network-nodes NN1-NN2-NN5-NN6-NN7-NN8-NN9 as presented in FIG. 1. It is further assumed that the normal hop-by-hop path leads through the network nodes NN1-NN2-NN4-NN8-NN9. It is also assumed that the shortest path tree holding means SPTHM of the source node SN1 only possesses information concerning the shortest path tree between the source node SN1 and all other network nodes of the internet protocol network as presented in FIG. 3. The source node SN1 uses this information to determine which network nodes on the explicit path are necessary to deviate the IP packet-flow from the hop-by-hop path in the following way. In a non-optimised approach of explicit routing, each IP packet-header would contain the network node addresses of the network-nodes NN1-NN2-NN5-NN6-NN7-NN8-NN9-DN in order to route an IP packet-flow from source node SN1 towards destination node DN. The explicit path determination means EPDM determines this explicit path by reception of the manually entered explicit route at the source node SN1. In order to reduce the number of destination addresses, the relevant intermediate network node determination means RINNDM of the source node SN1 then considers, if each of this network node addresses is necessary to be put in the packet-header for reaching the destination via the explicit path. This is done by using the next following algorithm together with the shortest path tree information as presented in FIG. 3: Consider each of the network node addresses on the explicit path NN1-NN2-NN5-NN6-NN7-NN8-NN9-DN, starting from the last network node NN9 and going in upstream direction, along the explicit path, towards the source node SN. If this network node is not situated on a branch of the shortest path tree, between the adjacent upstream network node and the closest downstream network node which was already selected to be relevant, it is necessary to select this network node also to be relevant.

Consequently it is determined that the following network nodes NN2-NN5-NN7-NN8 together with the destination node DN are relevant. Subsequently the relevant intermediate network node adding means RINNAM will add these relevant network nodes together with the destination node to each packet of the IP packet-flow. Further, the forwarding means FM of source node SN1 will forward the modified IP packet-flow towards the first network node as specified in the packet-header, network node NN2. The further continuation of the routing of the IP packet-flow does not differ from the handling of explicit routing as known in the art.

Figure 4:
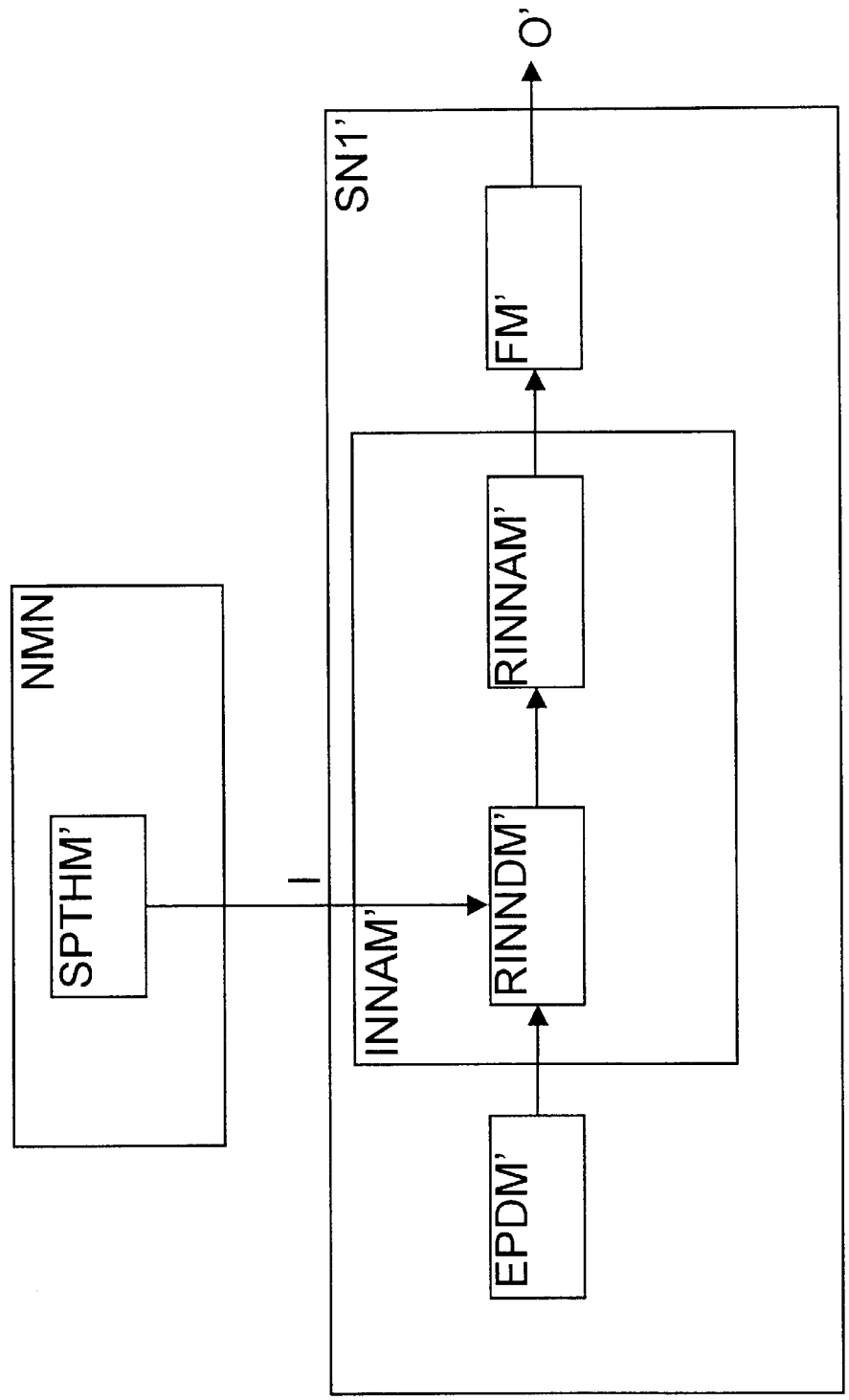
FIG. 4. represents the functional built-up of source node SN1 connected to a network management node NMN; and Each of FIG. 5 up to FIG. 11 respectively represents a shortest path tree from one of the network nodes towards all of the other network nodes, the source nodes SN1, SN2 and the destination node DN.
Figure 11:
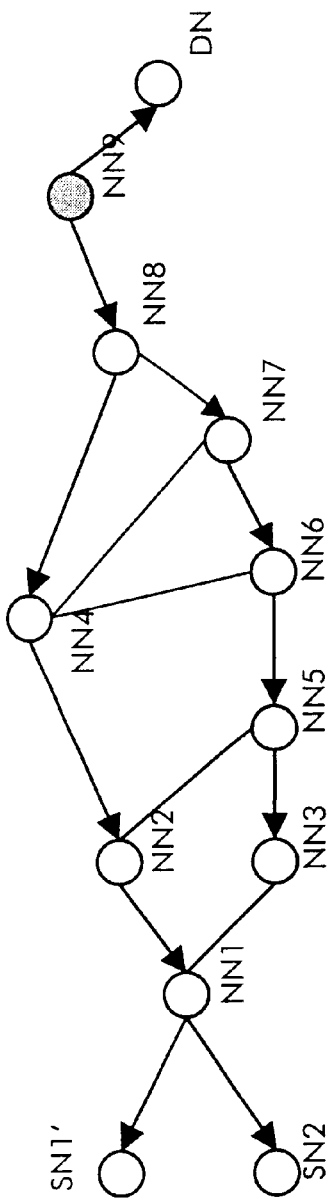

It is to be remarked that another possible implementation of the present invention is that the source node is provided with information concerning the shortest path trees from the source node, from each of the network nodes and the destination node towards all other nodes present within the network. Based hereupon the source node can determine the hop-by hop path towards the destination node. This embodiment is built up in the same way as the previously described embodiment. A difference compared to the previous described embodiment is that the shortest path tree holding means SPTHM is situated in a network management node NMN, as presented in FIG. 4, holding information about all shortest path trees from the source node, from each of the network nodes and the destination node towards all other nodes present within the network. The shortest path tree holding means SPTHM' of the network management node NMN further is connected via input I to the relevant intermediate network node determination means RINNDM' of source node SN1'. A difference from the before described embodiment is that the relevant intermediate network node determination means RINNDM' of source node SN1' is able to use these shortest path trees as presented in FIG. .5 up to FIG. 11 to determine which of the explicit node addresses are not necessary to put in the IP packet headers. Based on this information, which is at the disposal of the source node SN1', the source node SN1' determines which network nodes on the explicit path are necessary to deviate IP packet-flow from the hop-by-hop path in the following way. The explicit path determination means EPDM' of source node SN1' determines this explicit path by reception of the manually entered explicit route at the source node SN1'. In order to reduce the number of destination addresses, the relevant intermediate network node determination means RINNDM' of the source node SN1' then considers if each of this network node addresses is necessary to be put in each of the packet-headers of the IP packet-flow for reaching the destination via the explicit path. This is done by using the next following algorithm together with the shortest path tree information as presented in FIG. 5 up to 11: Consider each of the network node addresses on the explicit path NN1-NN2-NN5-NN6-NN7-NN8-NN9-DN, starting from the last network node NN9 and going in upstream direction towards the source node SN. If this network node is not the next hop node of the adjacent upstream network node in direction of the closest downstream network node which was already selected to be relevant, it is necessary to select this network node also to be relevant.

Consequently it is determined that the following network nodes NN2-NN5-NN7-NN8 together with the destination node DN are relevant. Subsequently the relevant intermediate network node adding means RINNAM' will add these relevant network nodes together with the destination node to each packet of the IP packet-flow. Further, the forwarding means FM' of source node SN1' will forward the modified IP packet-flow towards the first network node as specified in the packet-header, network node NN2. The further continuation of the routing of the IP packet-flow does not differ from the handling of explicit routing as known in the art.

It is further to be remarked that a kind of internet protocol network usually consists of a large number of source nodes, network nodes and destination nodes, but for reasons of simplicity only a limited network is described. There is also a source node SN2 included which may have the same functionality as described for source node SN1, SN1'.

Another remark is that the present invention can be implemented within other packet-based networks.

Although the above embodiment of the invention has been described by means of functional blocks, their detailed realisation based on this functional description should be obvious for a person skilled in the art and is therefore not described.

While the principles of the invention have been described above in connection with specific apparatus, it is to be clearly understood that this description is made only by way of example and not as a limitation on the scope of the invention, as defined in the appended claims.

What is claimed is:

1. An explicit routing method to be used in a packet-based network comprising a plurality of network nodes, source-nodes and destination nodes all interconnected by links, said method being used to route a packet-flow from a source node of said plurality of said source-nodes towards a destination node of said plurality of destination-nodes, along an explicit path through at least one of said network-nodes, said method comprising the steps of:
   a. determination of said explicit path of said packet-flow between said source-node and said destination-node;
   b. adding intermediate network-nodes addresses to all packets of said packet-flow; and
   c. forwarding said packet-flow from said source-node towards said destination-node along said explicit path, characterised in that said step b. comprises the sub-steps of:
      b1. determination of all relevant intermediate network-nodes on said explicit path which are necessary to deviate said packet-flow from a normal hop-by-hop-path onto said explicit path; and
      b2. adding addresses of only said determined relevant intermediate network-nodes to said packets of said packet-flow.

2. Explicit routing method according to claim 1, CHARACTERISED IN THAT said determination of relevant intermediate network-nodes is based on a shortest path tree from said source node towards each of said plurality of network-nodes and destination nodes.

3. Explicit routing method according to claim 1, CHARACTERISED IN THAT said determination of relevant intermediate network-nodes is based on a shortest path tree from each node of said plurality of network-nodes, of said source-nodes and of said destination nodes towards each other.

4. An explicit routing arrangement, for use in a packet-based network comprising a plurality of network nodes (NN1–NN9), source-nodes (SN1, SN1', SN2) and destination nodes (DN) all interconnected by links, said arrangement being adapted to route a packet-flow from a source node of said plurality of said source-nodes (SN1, SN1', SN2) towards a destination node of said plurality of destination-nodes (DN), along an explicit path through at least one of said network-nodes NN1–NN9), said arrangement comprising the following means:
   a. explicit path determination means (EPDM, EPDM'), adapted to determine said explicit path between said source-node (SN1, SN1', SN2) and said destination-node (DN);
   b. intermediate network-node adding means (INNAM, INNAM'), adapted to add intermediate network-nodes addresses to all packets of said packet-flow; and
   c. forwarding means (FM, FM'), adapted to forward said packet-flow from said source-node (SN1, SN1', SN2) towards said destination-node (DN) along said explicit path, characterised in that said intermediate network-node adding means (INNAM, INNAM') comprises:
      b1. relevant intermediate network-nodes determination means (RINNDM, RINNDM'), for determining all relevant intermediate network-nodes (NN1–NN9) on said explicit path which are necessary to deviate said packet-flow from a normal hop-by-hop-path onto said explicit path; and
      b2. relevant intermediate network-nodes adding means (RINNAM, RINNAM') for adding addresses of only said relevant intermediate network-nodes (NN1–NN9) to said packets of said packet-flow.

5. The explicit routing arrangement according to claim 4, characterised in that said relevant intermediate network-nodes determination means (RINNDM, RINND M') further determines said all relevant intermediate network-nodes based on a shortest path tree from said source node (SN1, SN1', SN2) towards each of said plurality of network-nodes (NN1–NN9) and destination nodes (DN).

6. The explicit routing arrangement according to claim 4, characterised in that said relevant intermediate network-nodes determination means (RINNDM, RINNDM') further determines said all relevant intermediate network-nodes based on a shortest path tree from each node of said plurality of network-nodes (NN1–NN9), source-nodes (SN1, SN1', SN2) and destination nodes (DN) towards each other of said plurality of said network-nodes (NN1–NN9) and destination nodes (DN).

7. A source node (SN1, SN1', SN2) comprising an explicit routing arrangement which is for use in a packet-based network, and which comprises a plurality of network nodes (NN1–NN9), source-nodes (SN1, SN1', SN2) and destination nodes (DN) all interconnected by links, said arrangement being adapted to route a packet-flow from a source node of said plurality of said source-nodes (SN1, SN1', SN2) towards a destination node of said plurality of destination-nodes (DN), along an explicit path through at least one of said network-nodes NN1–NN9), said arrangement comprising the following means:
   a. explicit path determination means (EPDM, EPDM'), adapted to determine said explicit path between said source-node (SN1, SN1', SN2) and said destination-node (DN);
   b. intermediate network-node adding means (INNAM, INNAM'), adapted to add intermediate network-nodes addresses to all packets of said packet-flow; and
   c. forwarding means (FM, FM'), adapted to forward said packet-flow from said source-node (SN1, SN1', SN2) towards said destination-node (DN) along said explicit path, characterised in that said intermediate network-node adding means (INNAM, INNAM') comprises:

b1. relevant intermediate network-nodes determination means (RINNDM, RINNDM'), for determining all relevant intermediate network-nodes (NN1–NN9) on said explicit path which are necessary to deviate said packet-flow from a normal hop-by-hop-path onto said explicit path; and b2. relevant intermediate network-nodes adding means (RINNAM, RINNAM') for adding addresses of only said relevant intermediate network-nodes (NN1–NN9) to said packets of said packet-flow.

8. The source node according to claim 7, wherein said relevant intermediate network-nodes determination means (RINNDM, RINND M') further determines said all relevant intermediate network-nodes based on a shortest path tree from said source node (SN1, SN1', SN2) towards each of said plurality of network-nodes (NN1–NN9) and destination nodes (DN).

9. The source node according to claim 7, wherein said relevant intermediate network-nodes determination means (RINNDM, RINNDM') further determines said all relevant intermediate network-nodes based on a shortest path tree from each node of said plurality of network-nodes (NN1–NN9), source-nodes (SN1, SN1', SN2) and destination nodes (DN) towards each other of said plurality of said network-nodes (NN1 –NN9) and destination nodes (DN).

* * * * *